United States Patent [19]

Kondo

[11] Patent Number: 5,722,080
[45] Date of Patent: Feb. 24, 1998

[54] INTER-STATION SYNCHRONIZATION METHOD

[75] Inventor: Seiji Kondo, Tokyo, Japan

[73] Assignee: NEC Corporation, Tokyo, Japan

[21] Appl. No.: 497,717

[22] Filed: Jun. 30, 1995

[30] Foreign Application Priority Data

Jun. 30, 1994 [JP] Japan ................... 6-149838

[51] Int. Cl.$^6$ ........................................ H04B 7/01
[52] U.S. Cl. ................. 455/502; 455/524; 370/324; 370/350; 375/356
[58] Field of Search ................. 455/51.1, 51.2, 455/33.2, 56.1, 67.1, 67.6, 502, 503, 524; 370/350, 324; 375/354, 356; 379/58, 59, 60

[56] References Cited

U.S. PATENT DOCUMENTS

| | | | |
|---|---|---|---|
| 5,293,380 | 3/1994 | Kondo | 370/95.1 |
| 5,355,515 | 10/1994 | Sicher | 455/33.2 |
| 5,396,541 | 3/1995 | Farwell et al. | 379/60 |
| 5,404,575 | 4/1995 | Lehto | 455/51.1 |

FOREIGN PATENT DOCUMENTS

| | | |
|---|---|---|
| 0437835 | 7/1991 | European Pat. Off. |
| 0593320 | 4/1994 | European Pat. Off. |
| 0594354 | 4/1994 | European Pat. Off. |
| 303939 | 12/1989 | Japan |
| 2-164140 | 6/1990 | Japan |
| WO107768 | 5/1994 | WIPO |

*Primary Examiner*—Reinhard J. Eisenzopf
*Assistant Examiner*—Lee Nguyen
*Attorney, Agent, or Firm*—Sughrue, Mion, Zinn, Macpeak & Seas, PLLC

[57] ABSTRACT

In an inter-station synchronization method establishing frame synchronization for a radio interval between radio base stations via a mobile station in a cellular mobile communication system constituted by a plurality of zones, a time alignment value corresponding to a mobile station which is in communication with a reference station is measured. An adjustment station receives a transmission signal from the mobile station which is in communication with the reference station, and a radio frame phase difference representing an offset between the received signal and a home intra-station radio frame synchronization signal is measured. A radio frame phase control value is obtained on the basis of a radio frame phase difference measured by the adjustment station and the time alignment value measured by the reference station. The phase of the radio frame synchronization signal of the adjustment station is adjusted in accordance with the obtained radio frame phase control value to be matched the phase with a phase of a radio frame synchronization signal in the reference station.

4 Claims, 3 Drawing Sheets

INTER-STATION SYNCHRONIZATION METHOD

BACKGROUND OF THE INVENTION

The present invention relates to an inter-station synchronization method of establishing frame synchronization for a radio interval between radio base stations via a mobile station in a cellular mobile communication system (e.g., a digital mobile phone system) constituted by a plurality of zones.

In a digital mobile phone system constituted by a plurality of zones, when a mobile station is to perform an handover operation, radio frame synchronization must be established between the respective radio base stations to shorten the time required to establish synchronization for a newly assigned channel and minimize interference caused by signals received across zones.

For this reason, as in "Method of Establishing Synchronization between Base Stations" in Japanese Patent Application No. 63-318397, a transmission signal from a mobile station which is in communication with a radio base station as a reference station is received by a radio base station as an adjustment station, and a radio frame synchronization signal for a radio interval in the adjustment station is generated from the received signal, thereby establishing frame synchronization for the radio interval between the base station and the adjustment station.

In this conventional inter-station synchronization method, if a zone has a large radius, a phase difference occurs between radio frame synchronization signals for a radio interval, which signals are respectively generated by radio base stations, owing to a propagation delay based on the distances between the radio base stations and a mobile station.

More specifically, there is a difference in phase between radio frame synchronization signals respectively generated by the adjustment station upon reception of transmission signals from a mobile station when it is located near the reference station and when the mobile station is located near the boundary of the cell of the reference station. In this case, in a zone which has a sufficiently small radius and in which the propagation delay is small regardless of the position of a mobile station used for inter-station synchronization, radio frame synchronization signals respectively generated by the reference station and the adjustment station are almost identical to each other. However, in a zone which has a large radius and in which the propagation delay greatly varies depending on the position of a mobile station used for inter-station synchronization, a large phase offset occurs between radio frame synchronization signals respectively generated by the reference station and the adjustment station. As a result, frame synchronization cannot be established for a radio interval between the reference station and the adjustment station In general, in order to suppress the phase difference between radio frame synchronization signals in the respective base stations within the range of one symbol or less, a zone radius must be set not to require alignment control for adjustment of the timing of a transmission signal from a mobile station.

Time alignment control is performed to adjust the reception timing of each radio base station to allow it to receive a transmission signal from a mobile station. The distance which demands time alignment control between a mobile station and a radio base station exceeds the following distance:

$$[3.0 \times 10^5 \text{ (km/sec)}]/[2 \times \text{symbol rate (sps)}]$$

In, for example, PDC, the symbol rate is 21 ksps. If, therefore, the zone radius is 7 km or less, no time alignment control is required regardless of the position of a mobile station in the zone. That is, no problem is posed in the conventional inter-station synchronization method. If, however, the zone radius exceeds 7 km, time alignment control is required, and a large phase offset occurs between radio frame synchronization signals in the base station and the adjustment station owing to this time alignment control. As a result, frame synchronization cannot be established for a radio interval between the reference station and the adjustment station.

SUMMARY OF THE INVENTION

The present invention has been made to solve the above problem, and has as its object to provide an inter-station synchronization method which can establish frame synchronization for a radio interval between a reference station and a radio base station even if a large zone radius is set, and time alignment control is required.

In order to achieve the above object, according to the present invention, there is provided an inter-station synchronization method of establishing frame synchronization for a radio interval between radio base stations via a mobile station in a cellular mobile communication system constituted by a plurality of zones, comprising the steps of measuring a time alignment value corresponding to a mobile station which is in communication with a reference station, causing an adjustment station to receive a transmission signal from the mobile station which is in communication with the reference station, and measuring a radio frame phase difference representing an offset between the received signal and a home intra-station radio frame synchronization signal, obtaining a radio frame phase control value on the basis of a radio frame phase difference measured by the adjustment station and the time alignment value measured by the reference station, and adjusting a phase of the radio frame synchronization signal of the adjustment station in accordance with the obtained radio frame phase control value to match the phase with a phase of a radio frame synchronization signal in the reference station.

DESCRIPTION OF THE PREFERRED EMBODIMENT

Figure 2:
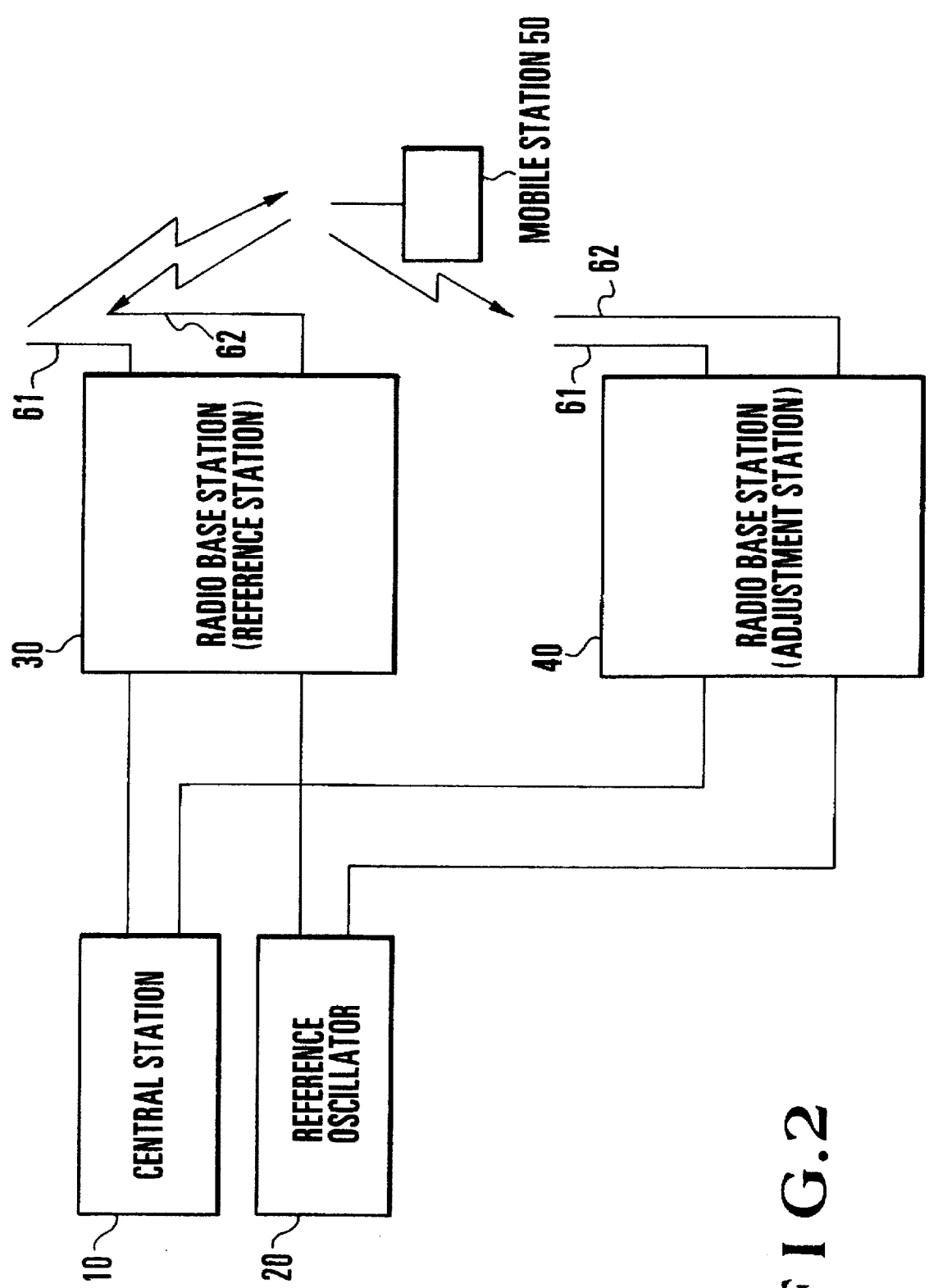
FIG. 2 is a block diagram showing the arrangement of the digital mobile phone system to which the present invention is applied.

An embodiment of the present invention will be described in detail below. FIG. 2 shows the arrangement of a digital mobile phone system to which the present invention is applied. Referring to FIG. 2, reference numeral 10 denotes a central station, 30 and 40, radio base stations; 50, a mobile station; 20, a reference oscillator for establishing frame synchronization for a radio interval between the base stations 30 and 40; 61, a transmission antenna; and 62, a reception antenna. A radio interval synchronization signal having the period of a frame for a radio interval is sent from the reference oscillator 20 to the radio base stations 30 and 40 via wire lines connecting the central station 10 to the base stations 30 and 40. The radio base stations 30 and 40 respectively generate home intra-station radio frame synchronization signals on the basis of the radio interval synchronization signals sent via the wire lines. Each base station transmits/receives signals to/from the mobile station 50 at the timing based on the radio frame synchronization signal.

The wire lines connecting the central station 10 to the radio base stations 30 and 40 have different distances and different repeaters, and hence radio interval synchronization signals reach the base stations 30 and 40 at different timings. For this reason, if the transmission/reception timings with respect to the mobile station 50 are determined by the above method, a timing error is caused between the transmission/reception timings of the radio base stations 30 and 40.

In order to prevent this, a method of establishing frame synchronization for a radio interval between the radio base stations 30 and 40 may be used. In this embodiment, frame synchronization is established for a radio interval between the radio base stations 30 and 40 in the following manner.

Assume that the radio base station 30 is a reference station, and the radio base station 40 is an adjustment station. As is apparent, the radio base stations 30 and 40 may respectively serve as an adjustment station and a reference station, and there are many radio base stations instead of two radio base stations. In this embodiment, for the sake of descriptive convenience, it is assumed that the two radio base stations 30 and 40 are representatives, and respectively serve as a reference station and an adjustment station.

In communicating with the mobile station 50, the radio base station (reference station) 30 performs transmission/reception at the timing based on a home radio frame synchronization signal. That is, the reference station 30 transmits a signal to the mobile station 50 on the basis of the home radio frame synchronization signal. The mobile station 50 performs transmission on the basis of the received signal. In this case, if the mobile station 50 is located near the radio base station 30, the timing of the transmission signal from the mobile station 50 almost coincides with the reception timing obtained from the home radio frame synchronization signal in the radio base station 30.

Figure 3:
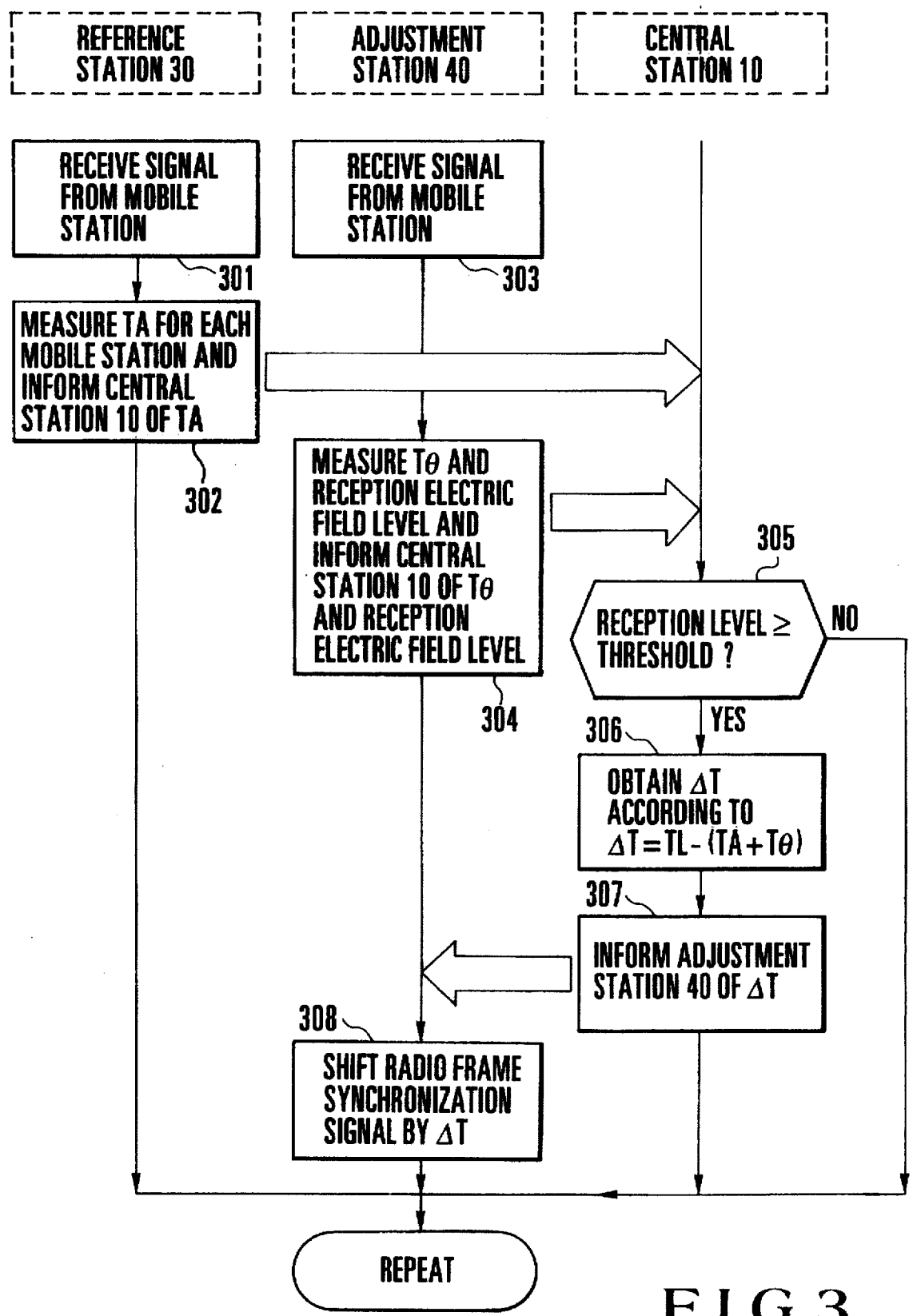
FIG. 3 is a flow chart for explaining phase adjustment of a radio frame synchronization signal in the adjustment station in the digital mobile phone system.

If the mobile station 50 is located far from the reference station 30, the reception timing of the transmission signal from the mobile station 50 differs from the home radio frame synchronization signal. For this reason, in order to match the reception timing of the transmission signal from the mobile station 50 with the reception timing of the reference station 30, the transmission timing of the mobile station 50 is quickened in accordance with the distance from the reference station 30. This operation is time alignment control. The radio base station 30 receives the signal from the mobile station 50 (step 301 in FIG. 3), and independently performs time aliment control. The radio base station 30 measures a time alignment value TA corresponding to each mobile station 50 in this time alignment control, and informs the central station 10 of this measured time alignment value TA (step 302).

Meanwhile, the radio base station (adjustment station) 40 receives a transmission signal from the mobile station 50 which is in communication with the reference station 30 (step 303). The adjustment station 40 then measures a reception timing error (radio frame phase difference) T$\theta$ obtained from the home radio frame synchronization signal. At the same time, the adjustment station 40 measures a reception electric field level. The adjustment 40 then informs the central station 10 of the measured radio frame phase difference T$\theta$ and the measured reception electric field level (step 304).

The central station 10 determines, on the basis of the information from the reference station 30 and the adjustment station 40, that the reception electric field level is equal to or higher than a threshold (step 305), and determines a radio frame phase control value $\Delta$T to be set in the adjustment station 40 (step 306). The central station 10 then informs the adjustment station 40 of this radio frame phase control value $\Delta$T (step 307). Upon reception of this information, the adjustment station 40 shifts the phase of the radio frame synchronization signal by the radio frame phase control value $\Delta$T (step 308).

Figure 1:
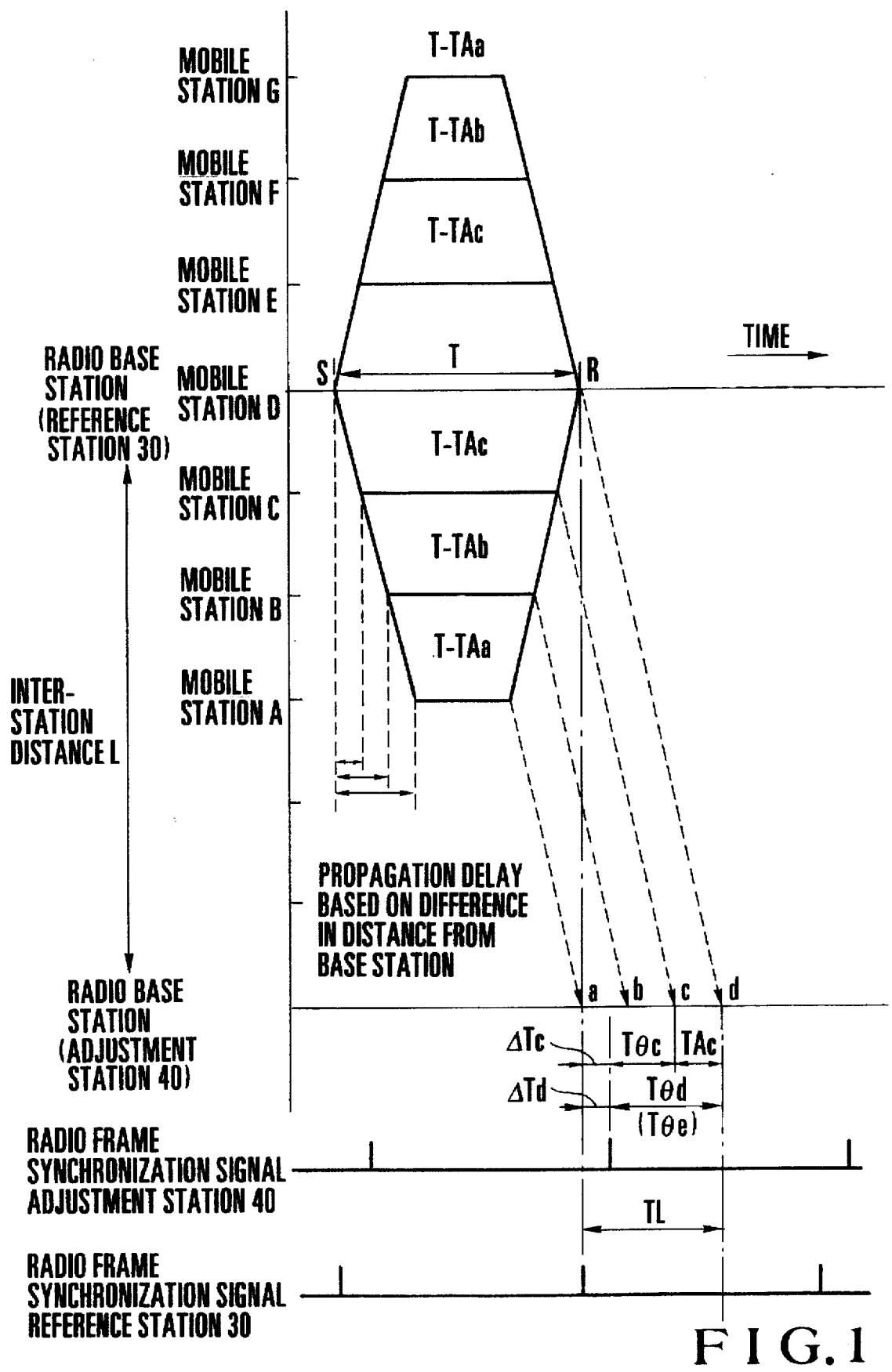
FIG. 1 is a chart for explaining phase adjustment of a radio frame synchronization signal in an adjustment station in a digital mobile phone system shown in FIG. 2.

Phase adjustment of a radio frame synchronization signal in the adjustment station 40 will be described in detail next with reference to FIG. 1. Referring to FIG. 1, the ordinate represents the distance; and the abscissa, the time. FIG. 1 shows a case wherein the distance between the reference station 30 and the adjustment station 40 is L, and seven mobile stations 50, i.e., mobile stations A, B, C, D, E, F, and G, are in communication with the reference station 30.

In the case of the mobile station D, since the distance between the mobile station and the reference station 30 is zero, a time alignment value TAd is 0. In this case, when a signal is transmitted from the reference station 30 at a transmission timing S, a signal is transmitted from the mobile station D a time T after the transmission timing S, and is received at a reception timing R of the reference station 30. The adjustment station 40 receives the signal at a time point d with a delay time corresponding to the distance L between the reference station 30 and the adjustment station 40.

If, therefore, a value $\Delta$Td ($\Delta$Td=TL−T$\theta$d) obtained by subtracting a radio frame phase difference T$\theta$d, which is measured from the transmission signal from the mobile station D, from a propagation delay time TL based on the distance L between the stations is set as the radio frame phase control value $\Delta$T in the adjustment station 40, the phase of the radio frame synchronization signal in the reference station 30 and that of the radio frame synchronization signal in the adjustment station 40 coincide with each other.

In the case of the mobile station C, since there is a distance between the mobile station and the reference station 30, the time alignment value is TAc. When a signal is transmitted from the radio base station 30 at the transmission timing S, a signal is transmitted from the mobile station C a time (T−TAc) after the transmission timing S, and is received at the reception timing R of the reference station 30. The radio base station 40 receives the signal at a timing c earlier than the time point d by the value TAc.

If, therefore, a radio frame phase difference T$\theta$c is measured from the transmission signal from the mobile station C having the time alignment value TAc, a radio frame phase control value $\Delta$Tc ($\Delta$Tc=TL−(TAc+T$\theta$c)) equal to the radio frame phase control value $\Delta$Td measured from the transmission signal from the mobile station D located near the reference station 30 can be obtained by subtracting the sum of the value TAc and the radio frame phase difference T$\theta$c from the propagation delay time TL.

In addition to the mobile station C, there is another mobile station which has the time alignment value TAc. In FIG. 1, the mobile station E also has the time alignment value TAc. The mobile station E is not located between the reference station 30 and the adjustment station 40 but is located on the opposite side thereto. In the mobile station E, the timing at which the adjustment station 40 receives a transmission signal from the mobile station E corresponds to the time point d as in the mobile station D whose time alignment value is 0. A radio frame phase control value $\Delta Te$, therefore, is given by $\Delta Te=TL-(T\theta e+TAc)=TL-(T\theta d+TAc)$. That is, the wrong radio frame phase control value $\Delta T$ is set in the adjustment station 40.

For this reason, in this embodiment, a radio frame phase difference measured from a transmission signal from a mobile station which is not located between the reference station 30 and the adjustment station 40 is eliminated by using a reception electric field level. If, for example, the reception electric field levels of transmission signals from the mobile stations C and E having the same time alignment value are compared with each other, it is apparent that the reception electric field level of the transmission signal from the mobile station C is higher. By setting a reception electric field level threshold, a radio frame phase difference measured from a transmission signal from the mobile station E is made invalid. In this manner, a reception electric field level threshold is set for each time alignment value, and a radio frame phase difference measured from a transmission signal having a reception electric field level lower than the threshold is made invalid, thereby preventing the wrong radio frame phase control value $\Delta T$ from being set in the adjustment station 40.

Similarly, transmission signals from the mobile stations B and A are respectively received by the adjustment station 40 at reception timings b and a. Time alignment values TAb and TAa a are added to radio frame phase differences T$\theta$a and T$\theta$b respectively measured from the transmission signals from the mobile stations B and A, and the respective sums are subtracted from the propagation delay time TL to obtain radio frame phase differences $\Delta$Tb and $\Delta$Ta, each of which is equal to the radio frame phase difference $\Delta$Td. In contrast to this, radio frame phase differences $\Delta$Tf and $\Delta$Tg measured from transmission signals from the mobile stations F and G having the same time alignment value as that of the mobile stations B and A are made invalid because the reception electric field level of each transmission signal received by the adjustment station 40 is lower than the threshold. In this embodiment, all these determination operations are performed by the central station 10. However, information from the radio base station 30 may be sent to the adjustment station 40 via the central station 10 to perform such determination operations in the adjustment station 40.

As is apparent from the above description, according to the first aspect of the present invention, a radio frame phase control value is obtained on the basis of a radio frame phase difference measured by an adjustment station and a time alignment value measured by a reference station. The phase of a radio frame synchronization signal in the adjustment station is adjusted in accordance with this obtained radio frame phase control value to be matched with the phase of a radio frame synchronization signal in the reference station. With this operation, even if a large zone radius is set, and time alignment control is required, frame synchronization can be established for a radio interval between the reference station and the adjustment station.

According to the second aspect of the present invention, the validity of a radio frame phase difference measured by an adjustment station is determined on the basis of a reception electric field level measured by the adjustment station and a time alignment value measured by a reference station. A radio frame phase control value is obtained on the basis of the radio frame phase difference determined as a valid value and the time alignment value measured by the reference station. The phase of a radio frame synchronization signal in the adjustment station is adjusted in accordance with this obtained radio frame phase control value to be matched with the phase of a radio frame synchronization signal in the reference station. In addition to the effect of the first aspect of the present invention, the following effect can be obtained. When a mobile station is located on the opposite side to the reference station and the adjustment station, phase adjustment based on an erroneous radio frame phase control value can be prevented.

According to the third aspect of the present invention, the radio frame phase control value $\Delta T$ is given by $\Delta T=TL-(T\theta+TA)$ in the first or second aspect of the present invention, and the radio frame phase control value $\Delta T$ can be obtained as an accurate value.

What is claimed is:

1. A inter-station synchronization method of establishing frame synchronization for a radio interval between radio base stations via a mobile station in cellular mobile communication system constituted by a plurality of zones, comprising the steps of:

measuring a time alignment value corresponding to a mobile station which is in communication with a reference station;

causing an adjustment station to receive a transmission signal from said mobile station which is in communication with said reference station, and measuring a radio frame phase difference representing an offset between the received signal and a home intra-station radio frame synchronization signal, wherein said home intra-station radio frame synchronization signal is generated on the basis of an interval synchronization signal sent via wire;

obtaining a radio frame phase control value on the basis of the radio frame phase difference measured by said adjustment station and the time alignment value measured by said reference station, adjusting a phase of the radio frame synchronization signal of said adjustment station in accordance with the obtained radio frame phase control value to match the phase with a phase of a radio frame synchronization signal in said reference station.

2. An inter-station synchronization method of establishing frame synchronization for a radio interval between radio base stations via a mobile station in a cellular mobile communication system constituted by a plurality of zones, comprising the steps of:

measuring a time alignment value corresponding to a mobile station which is in communication with a reference station;

causing an adjustment station to receive a transmission signal from said mobile station which is in communication with said reference station, and measuring a radio frame phase difference representing an offset between the received signal and a home intra-station radio frame synchronization signal, together with a reception electric field level;

determining validity of the radio frame phase difference measured by said adjustment station on the basis of the reception electric field level measured by said adjustment station and the time alignment value measured by said reference station;

obtaining a radio frame phase control value on the basis of the radio frame phase difference determined as a valid value and the time alignment value measured by said reference station; and adjusting a phase of the radio frame synchronization signal of said adjustment station in accordance with the obtained radio frame phase control value to match the phase with a phase of a radio frame synchronization signal in said reference station.

3. A method according to claim 2, wherein the radio frame phase control value is a value obtained by subtracting a sum of the radio frame phase difference and the time alignment value from a propagation delay time based on a distance between said reference station and said adjustment station.

4. A inter-station synchronization method of establishing frame synchronization for a radio interval between radio base stations via a mobile station in cellular mobile communication system constituted by a plurality of zones, comprising the steps of:

measuring a time alignment value corresponding to a mobile station which is in communication with a reference station;

causing an adjustment station to receive a transmission signal from said mobile station which is in communication with said reference station, and measuring a radio frame phase difference representing an offset between the received signal and a home intra-station radio frame synchronization signal;

obtaining a radio frame phase control value on the basis of the radio frame phase difference measured by said adjustment station and the time alignment value measured by said reference station, wherein the radio frame phase control value is a value obtained by subtracting a sum of the radio frame phase difference and the time alignment value from a propagation delay time based on a distance between said reference station and said adjustment station.

adjusting a phase of the radio frame synchronization signal of said adjustment station in accordance with the obtained radio frame phase control value to match the phase with a phase of a radio frame synchronization signal in said reference station.

* * * * *